(12) United States Patent
Wu et al.

(10) Patent No.: US 7,322,839 B1
(45) Date of Patent: Jan. 29, 2008

(54) ELECTRICAL CONNECTOR

(75) Inventors: Yin-lung Wu, Tu-Cheng (TW); Ming-chiang Chen, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/594,805

(22) Filed: Nov. 9, 2006

(51) Int. Cl.
 *H01R 13/62* (2006.01)
(52) U.S. Cl. .................. 439/159; 439/160; 439/630
(58) Field of Classification Search ........... 439/157, 439/159, 630, 160
 See application file for complete search history.

(56) References Cited

U.S. PATENT DOCUMENTS

| | | | |
|---|---|---|---|
| 4,952,161 A * | 8/1990 | Komatsu | 439/155 |
| 5,421,737 A * | 6/1995 | Chen et al. | 439/157 |
| 6,394,827 B2 * | 5/2002 | Nogami | 439/159 |
| 7,104,820 B1 * | 9/2006 | Lu et al. | 439/159 |
| 2007/0004257 A1 * | 1/2007 | Hsu et al. | 439/159 |

* cited by examiner

*Primary Examiner*—Truc T. Nguyen
*Assistant Examiner*—X. Chung-Trans
(74) *Attorney, Agent, or Firm*—Rosenberg, Klein & Lee

(57) ABSTRACT

A memory card connector includes an insulating housing, a plurality of electric terminals, a left ejector, a right ejector and a cover. The insulting housing includes a base, a left wall, a right wall and a front wall. A left sliding trough and a left moving groove are formed on one side of the base. A right sliding trough and a right moving groove are formed on the other side of the base. The left ejector and the right ejector are placed on both sides of the insulating housing. A plurality of electric terminals are arranged at the terminal troughs.

3 Claims, 6 Drawing Sheets

ELECTRICAL CONNECTOR

BACKGROUND OF THE INVENTION

1. Field of the Invention

This present invention relates to a card connector, and more particularly to a memory card connector.

2. The Related Art

In recent years, memory cards have become popular and a variety of electronic cards has been used widely. A memory card includes a plurality of contacts for contacting a memory card connector with a card reader system or external equipment.

A conventional memory card connector applied to portable telephones and the like has an insulating housing, a cover, an ejecting apparatus and a plurality of electric terminals. A plurality of electric terminal troughs are formed in the insulating housing. The electric terminals are accepted in the electric terminal troughs. The ejecting apparatus is located in the insulating housing and used to inject/eject a memory card from the conventional memory card connector.

The conventional memory card connector described above has only one ejector which is placed on one side of the insulting housing. When the memory card is inserted into the conventional memory card connector, the memory card is easy to lean in the conventional memory card connector by some fault insertion. Meanwhile, the memory card is easy to be locked in the conventional memory card connector while the memory card leaning in the conventional memory card connector. When the memory card is injected/ejected from the conventional memory card connector, furthermore the memory card and the conventional memory card connector are easy to be destroyed.

SUMMARY OF THE INVENTION

Accordingly, an object of the present invention is to provide a memory card connector. The memory card connector has an insulating housing, a plurality of electric terminals, a left ejector, a right ejector and a cover. The insulting housing includes a base, a left wall arranged on the left side of the base, a right wall located on the right side of the base and a front wall located on the front of the base. A plurality of terminal troughs are formed in the base. The left wall, the right wall and the front wall define a holding chamber. A left sliding trough and a left moving groove are formed on the base and adjacent to the left wall. A left pillar is engaged horizontal in the left sliding trough. A right sliding trough and a right moving groove are formed on the base and adjacent to the right wall. A right pillar is engaged horizontal in the right sliding trough. The left ejector includes a left body, a left connecting bar and a left spring. The left body has a left upper surface formed on the left of the left body, a left lower surface formed on the right of the left body, and a drop formed between the left upper surface and the left lower surface. A left guide groove is formed on the left upper surface. A left push cam is projected on the front of the left lower surface. A left groove is formed at the back of the left body and beneath the lower surface. A left moving pillar is arranged horizontal in the left groove. The right ejector includes a right body, a right connecting bar, and a right spring. The right body has a right lower surface formed on the left of the right body, a right upper surface formed on the right of the right body, a drop formed between the right lower surface and the right lower surface. A right insertion cam is projected on the front of the right upper surface. A right guide groove is formed on the right upper surface. A right groove is formed at the back of the right body and beneath the right lower surface. A right moving pillar is arranged horizontal in the right groove. The left ejector and the right ejector are placed on both sides of the insulating housing. A plurality of electric terminals are arranged at the terminal troughs. One end of the left spring covers on the left moving pillar, and the other end of the left spring covers on the left pillar. One end of the left connecting bar is accepted in the left guide groove, and the other end of the left connecting bar is accepted in the insulating housing. One end of the right spring covers on the right moving pillar, and the other end of the right spring covers on the right pillar. One end of the right connecting bar is accepted in the right guide groove, and the other end of the right connecting bar is accepted in the insulating housing.

When a memory card as a SIM card is inserted into the memory card connector, the left ejector and the right ejector are pushed inward symmetrically. When the memory card is withdrawn from the memory card connector, the left ejector and the right ejector drive symmetrically the memory card out of the memory card connector. By the unitary layout of the left ejector and the right ejector, the memory card connector ensures that both sides of the memory card are injected/ejected evenly and avoid leaning.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE PREFERRED EMBODIMENT

Figure 1:
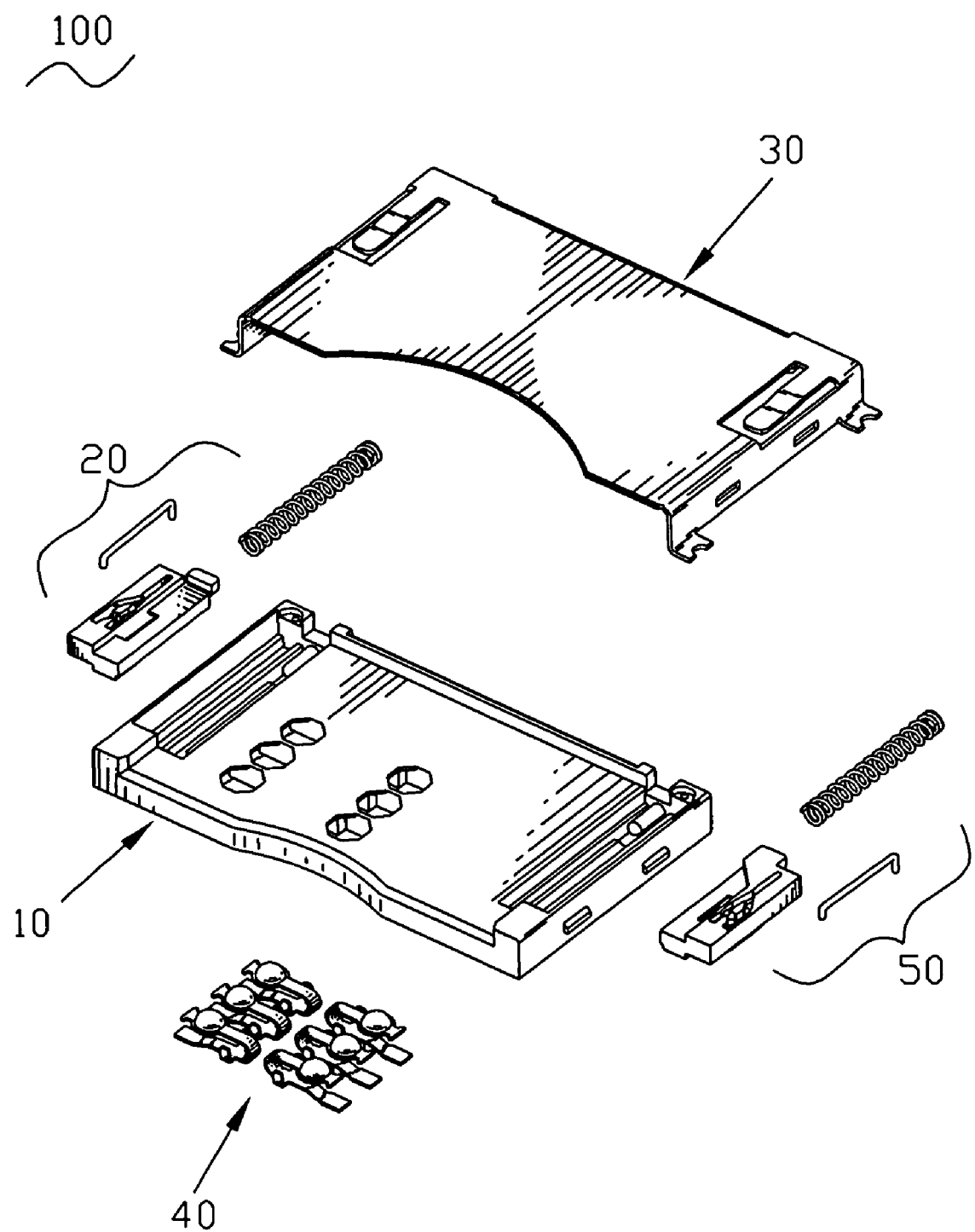
FIG. 1 is an exploded perspective view of a memory card connector of the present invention.

First referring to FIG. 1, a memory card connector 100 includes an insulating housing 10, a left ejector 20, a right ejector 50, a cover 30 and a plurality of electric terminals 40.

Figure 2:
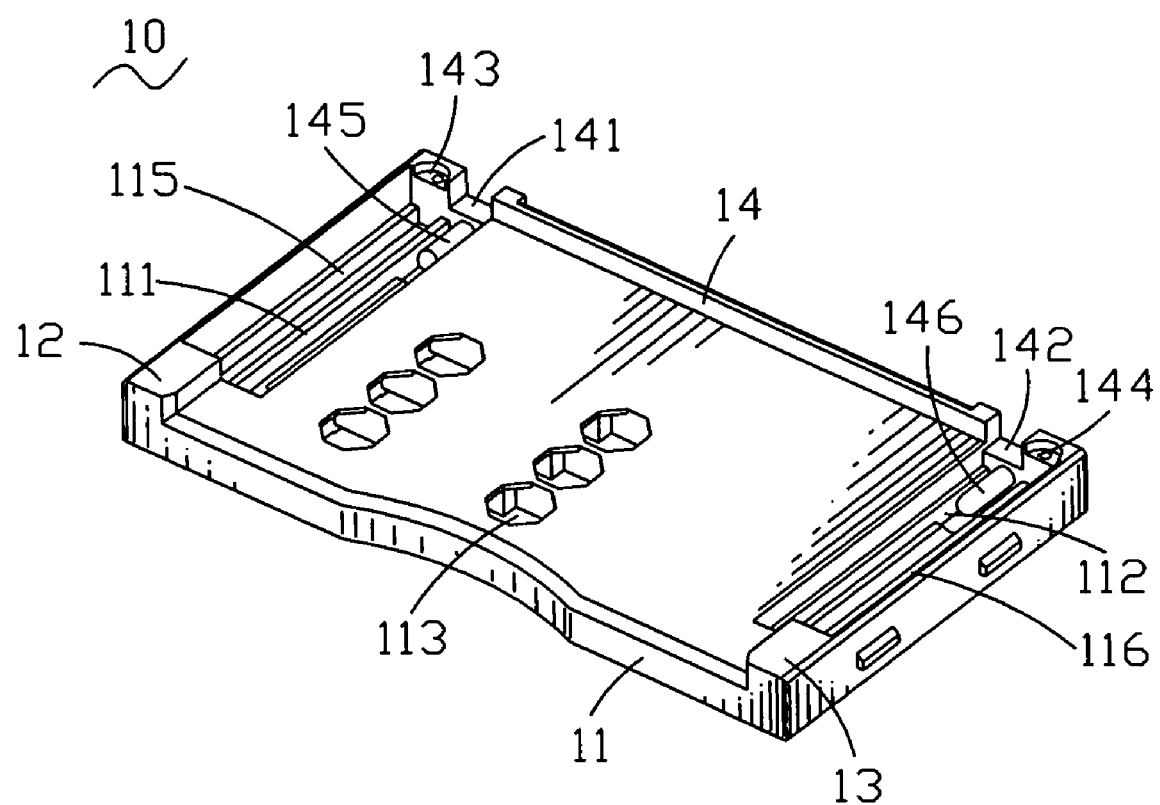
FIG. 2 is a perspective view of an insulating housing of the memory card connector.

Referring to FIG. 2, the insulting housing 10 includes a base 11, a left wall 12 arranged on the left side of the base 11, a right wall 13 located on the right side of the base 11 and a front wall 14 located on the front of the base 11. The left wall 12, the right wall 13 and the front wall 14 define a holding chamber. Both tips of the front wall 14 sag downward to form a left containing hole 143 and a right containing hole 144. A left recess 141 and a right recess 142 are engendered symmetrically and adjacent to the inner of the left containing hole 143 and the right containing hole 144. A left sliding trough 111 and a left moving groove 115 are formed in the base 11 and adjacent to the left wall 12. The left recess 141 and the left sliding trough 111 are in a line.

The left moving groove 115 is much nearer to the left wall 12 relatively to the left sliding trough 111. A left pillar 145 is formed in the front of the left sliding trough 111 and plumbed horizontally with the front wall 14. A right sliding trough 112 and a right moving groove 116 are formed in the base 11 and adjacent to the right wall 13. The right recess 141 and the right sliding trough 112 are in a line. The right moving groove 116 is much nearer to the right wall 12 relatively to the right sliding trough 112. A right pillar 146 is formed in the front of right sliding trough 112 and plumbed horizontally with the front wall 14. A plurality of terminal troughs 113 are formed in the base 11 between the left sliding trough 111 and the right sliding trough 112.

Figure 3A:
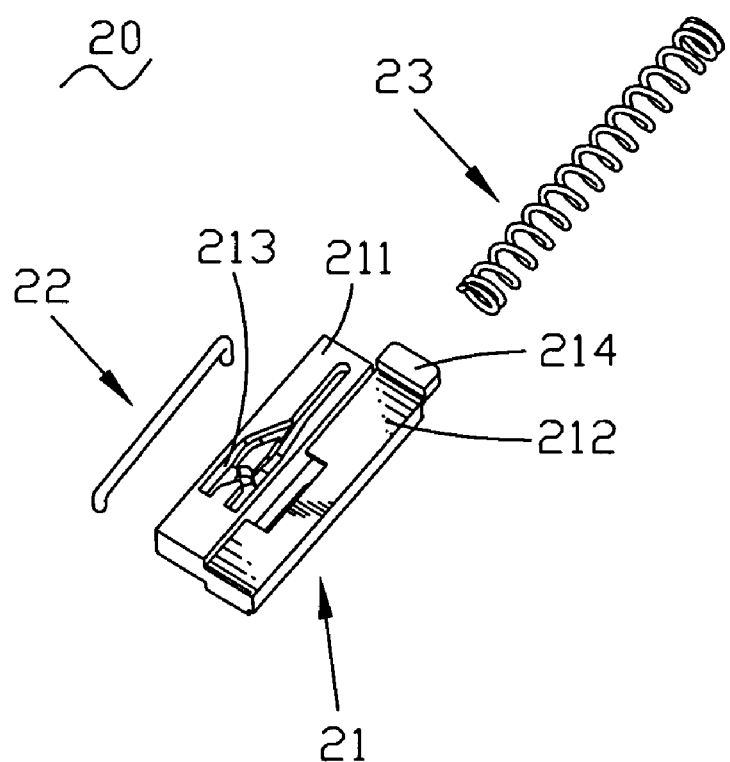
FIGS. 3A and 3B are perspective views of a left ejector of the memory card connector.
Figure 3B:
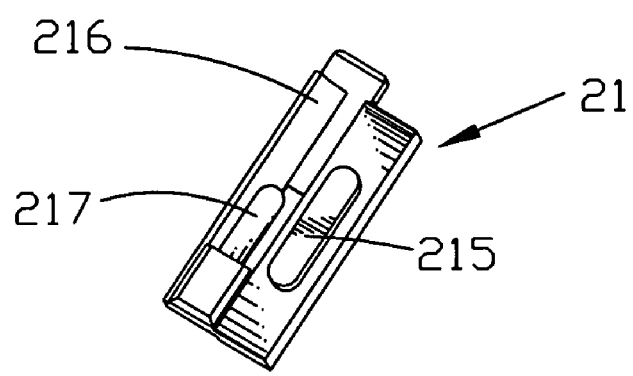

Referring to FIGS. 3A and 3B, the left ejector 20 includes a left body 21, a left connecting bar 22, and a left spring 23. The left body 21 has a left upper surface 211 formed on the left of the left body 21 and a left lower surface 212 formed on the right of the left body 21. A drop is formed between the left upper surface 211 and the left lower surface 212. A left guide groove 213 is formed on the left upper surface 211. A left push cam 214 is projected on the front of the left lower surface 212. A left sliding block 215 is located beneath the left upper surface 211. A left groove 216 is formed at the back of the left body 21. A left moving pillar 217 is arranged horizontal in the left groove 216. The middle portion of the left connecting bar 22 is a straight bar, and the two ends of the left connecting bar 22 are bent downward.

Figure 4A:
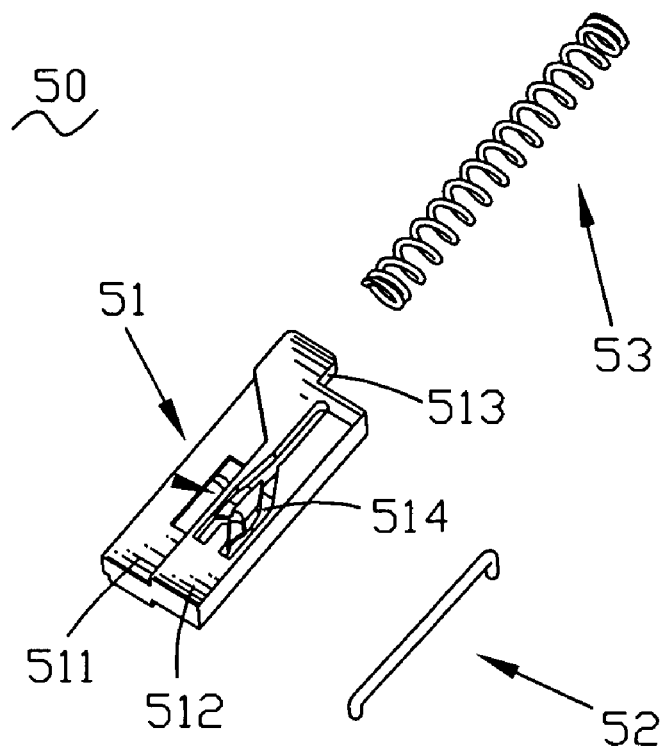
FIGS. 4A and 4B are perspective views of a right ejector of the memory card connector.
Figure 4B:
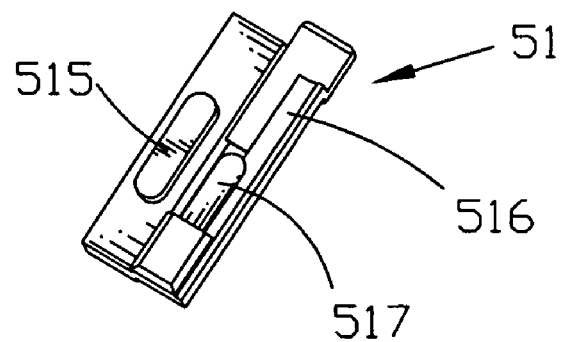

Referring to FIGS. 4A and 4B, the right ejector 50 includes a right body 51, a right connecting bar 52, and a right spring 53. The right body 51 has a right lower surface 511 formed on the left of the right body 51 and a right upper surface 512 formed on the right of the right body 51. A drop formed between the right lower surface 511 and the right lower surface 512. A right insertion cam 513 is projected on the front of the right upper surface 512. A right guide groove 514 is formed on the right upper surface 512. A right sliding block 515 is projected at the back of the right upper surface 512. A right groove 516 is formed at the back of the right body 51. A right moving pillar 517 is arranged horizontal in the right groove 510.

Figure 5:
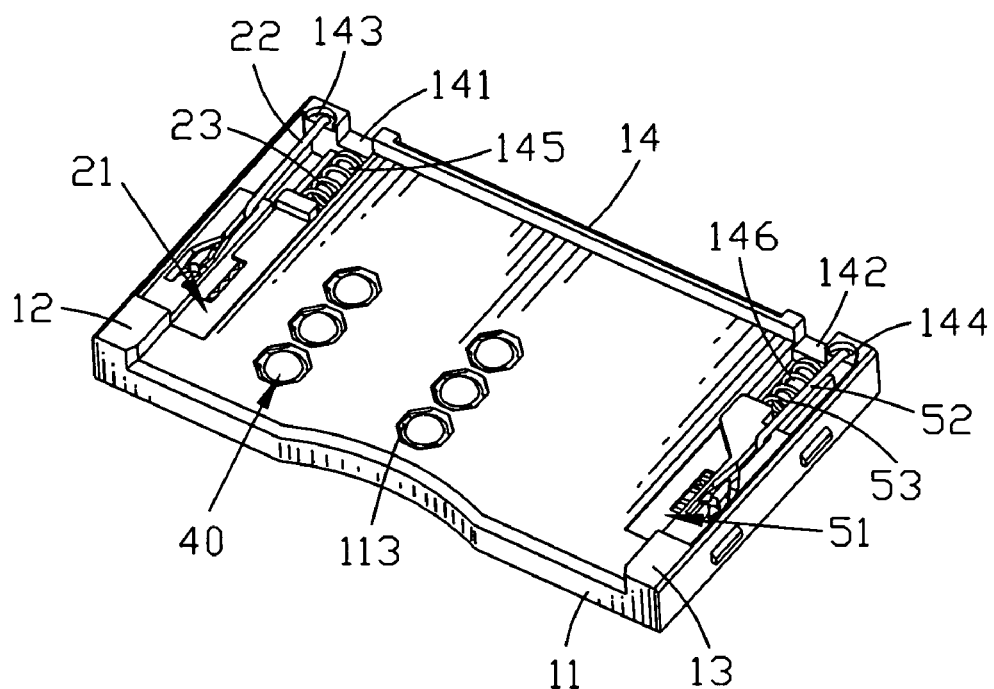
FIG. 5 is a perspective view of the insulating housing, the left ejector, the right ejector and a plurality of electric terminals assembled in the memory card connector.

Referring to FIG. 5 in conjunction with FIGS. 2-4B, the left ejector 20 is placed on the left side of the insulating housing 10. The left sliding block 215 is accepted in the left moving groove 115. The left moving pillar 219 is accepted in the left sliding trough 111. The front of the left spring 23 covers on the left pillar 145 and the other side of the left spring 23 covers on the left moving pillar 217. The front of the connecting bar 22 is located on the left containing hole 143, and the other side of the connecting bar 22 is located on the left guide groove 212. The right ejector 50 is placed on the right of the insulating housing 10. The right sliding block 515 is accepted in the right moving groove 116. The right moving pillar 517 is accepted in the right sliding trough 112. The right lower surface 511 of the right body 51 is arranged in the inner of the holding chamber. The front of the right spring 53 covers on the right pillar 146, and the other side of the right spring 53 covers on the right moving pillar 517. The front of the right connecting bar 52 is located on the right containing hole 144, and the other side of the right connecting bar 52 is located on the right guide groove 514. The electric terminals 40 are arranged at the terminal troughs 113.

Figure 6:
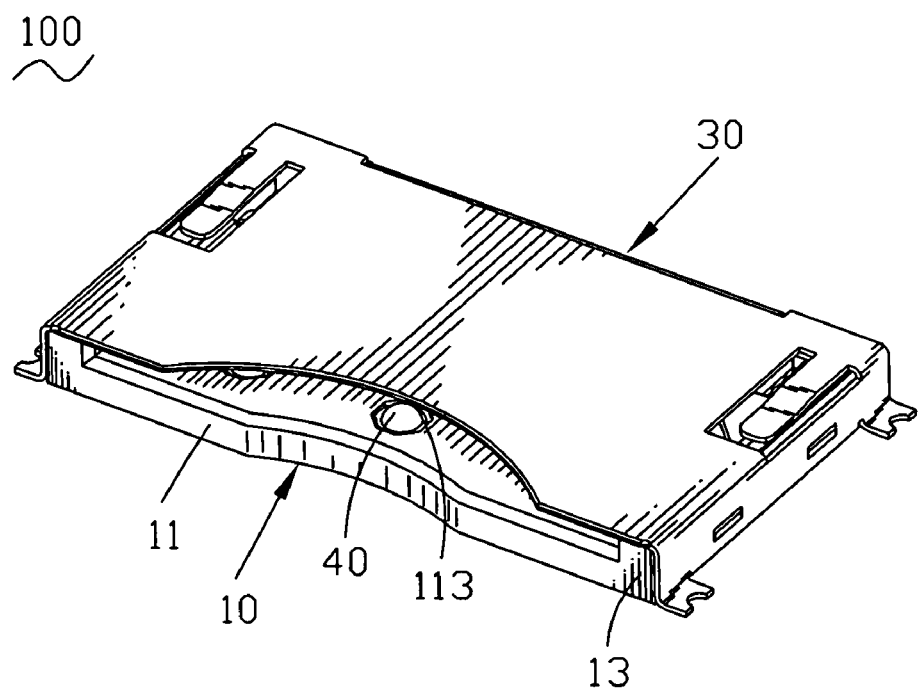
FIG. 6 is a perspective view of the memory card connector.

Referring to FIG. 6 in conjunction with FIG. 5, the left ejector 20 is placed on the left side of the insulating housing 10. The right ejector 50 is placed on the right side of the insulating housing 10. The electric terminals 40 are located at the electric terminal troughs 113. The cover 30 covers on the insulating housing 10.

Figure 7:
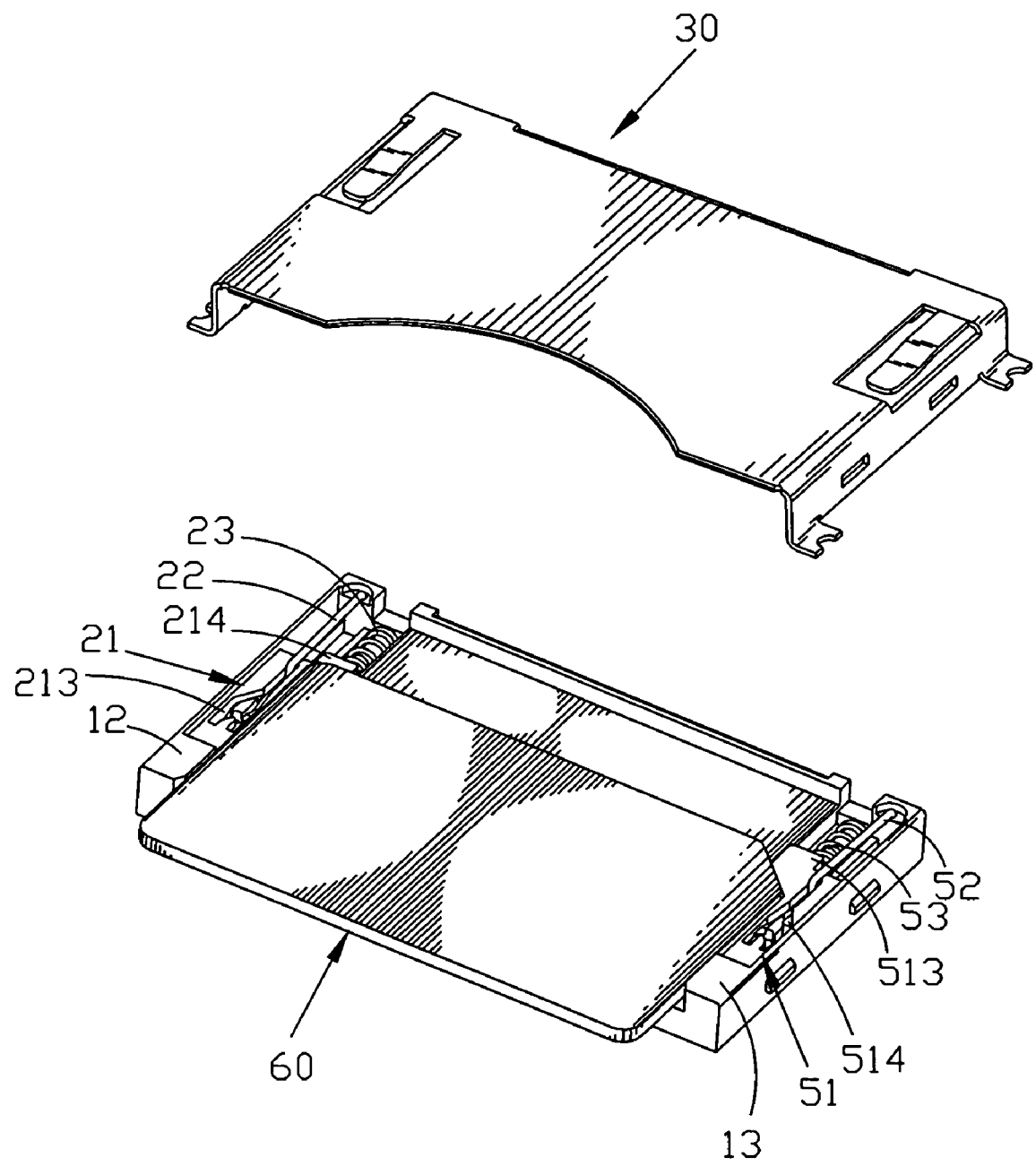
FIG. 7 is a perspective view showing the memory card connector of the present invention when a memory card is used in the present invention.

Referring to FIG. 7 and FIG. 5, when a memory card 60 is inserted into the memory card connector 100, the front ends of the memory card 60 resist the left push cam 214 and the right insertion cam 513. The left spring 23 and the right spring 53 are compressed synchronously when the left ejector 20 and the right ejector 50 are rushed into the inner of the memory card connector 100. The rear of the left connecting bar 22 moves from the front end of the left guide groove 212 to the rear end of the left guide groove 212. At the same time the rear of the right connecting bar 52 moves from the front end of the right guide groove 514 to the rear end of the right guide groove 514. When the left body 21 and the right body 51 move for a certain distance, the left push cam 214 is pushed forward and accepted in the left recess 141. Meanwhile, the right insertion cam 513 is pushed forward and accepted in the right recess 142. At this time the memory card 60 is located in the memory card connector 100 successfully.

When the memory card 60 is taken out from the memory card connector 100, the left push cam 214 resists one end of the memory card 60, and the right insertion cam 513 resists the other end of the memory card 60. The left spring 23 and the right spring 53 are released synchronously. In this case, both sides of the SIM card 60 are pushed evenly. The edges of the memory card 60 slide against the left wall 12 and the right wall 13. The rear of the left connecting bar 22 is moved from the rear end of the left guide groove 212 to the front end of the left guide groove 212. At the same time the rear of the right connecting bar 52 is moved from the rear end of the right guide groove 514 to the front end of the right guide groove 514. So the memory card 60 can be taken out from the memory card connector 100 successfully.

An embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A memory card connector, comprising:
an insulating housing, having a base, a left wall arranged on the left side of the base, a right wall located on the right side of the base, a front wall located on front of the base, a left opening and right opening formed on the front wall of the insulating housing, a left sliding trough and a left moving groove formed on the base and being adjacent to the left wall, a right sliding trough and a right moving groove formed on the base and being adjacent to the right wall, a plurality of terminal troughs engendered on the base between the left sliding trough and the right sliding trough; wherein the left opening and the right opening align with the left sliding trough and the right sliding trough
a left ejector, having a left body, a left connecting bar, and a left spring, a left upper surface and a left lower surface formed on the left body, a drop formed between the left upper surface and the left lower surface, a left guide groove formed on the left upper surface, a left push cam projected on the front of the left low surface;
a right ejector, having a right body, a right connecting bar and a right spring, a right upper surface and a right lower surface formed on the right body, a drop formed between the right upper surface and the right lower surface, a right guide groove formed on the right upper surface, a right insertion cam projected on the front of the right upper surface, said left and right connecting bars being inserted into respective left and right containing holes formed within said left and right walls respectively on one end and within said left and right guide grooves respectively at an opposing end; wherein the left ejector and the right ejector are substantially identical a cover, covering the SIM card connector; and a plurality of electric terminals, received in the terminal troughs.

2. The memory card connector as claimed in claim 1, further comprising a left sliding block formed at the back of the left upper surface and accepted in the left moving groove.

3. The memory card connector as claimed in claim 1, further comprising a right sliding block projected at the back of the right upper surface and accepted in the right moving groove.

* * * * *